United States Patent

[11] 3,615,744

[72] Inventors: Makoto Yokoo, Toyonaka; Junji Ogura, Minoo; Hiroshi Ikeda, Takatsuki, all of Japan
[21] Appl. No. 742,187
[22] Filed July 3, 1968
[45] Patented Oct. 26, 1971
[73] Assignee Takeda Chemical Industries, Ltd. Osaka, Japan
[32] Priority July 3, 1967
[33] Japan
[31] 42/42665

[54] ANTIFOULING PAINTS
7 Claims, No Drawings

[52] U.S. Cl. .................................................. 106/15,
106/16, 260/27, 260/32.8, 260/33.6
[51] Int. Cl. ...................................................... C09d 5/14

[50] Field of Search .................................... 106/15 AF, 16, 17, 18; 260/396, 27, 32.8, 33.6; 424/331

[56] References Cited
UNITED STATES PATENTS

| | | | |
|---|---|---|---|
| 2,829,082 | 4/1958 | O'Brien .................. | 424/331 |
| 3,111,456 | 11/1963 | Hochman et al. ............. | 106/15 X |
| 3,214,279 | 10/1965 | Scott .......................... | 106/15 |
| 3,266,913 | 8/1966 | Hardy et al. ................. | 106/15 |

Primary Examiner—Lorenzo B. Hayes
Attorney—Wenderoth, Lind and Ponack

ABSTRACT: An antifouling paint, useful interalia in preventing marine growth on ship bottoms, hulls, nets, piles, etc., contains a synergistic combination of 2-amino-3-chloro-1,4-naphthoquinone, a copper compound (e.g. a basic copper sulfate) and an organic tin compound (tributyl tin fumarate, tributyl tin fluoride) in a suitable vehicle.

ANTIFOULING PAINTS

The present invention relates to antifouling paints.

The protection of structures which are subjected to submersion in sea water, lakes, streams or reservoirs, for example, ship bottoms, fishing nets, cultivation facilities (ropes, piles, etc.) and other surfaces, from fouling organisms is a very serious and long existing problem. Such fouling organisms, especially marine growth, involve both plants and animals, such as acorn-shells (Balanindae), goose mussels (Lepadoids), oyster (Ostrea), ascidian (Styela), barnacles (Conchodermae), tubeworms (Serpulidae), sea moss (Hydroidae), and algae. For solving the problem, a large number of compositions containing poisons: e.g. copper oxide, cuprous oxide, mercuric oxide, copper carbonate, copper oleinate, triphenyl tin chloride, phenyl mercuric acetate, triethyl lead oleate, dichloro-diphenyl-trichloromethane, and cuprous oxide and mercuric oxide, etc., have been proposed and tested. However, none of these has been able satisfactorily to prevent marine growth on ship bottoms and hulls, etc. over a prolonged period of time.

A principal object of the present invention is, thus, to provide new and highly effective antifouling paints for preventing marine growth on surfaces under water (e.g. sea water, lakes, streams or reservoirs) for a prolonged period of time.

Other objects of the present invention and advantageous features thereof will become apparent as the description proceeds.

The present invention is based on the unexpected finding that a remarkable synergistic effect exists in the combination of 2-amino-3-chloro-1,4-naphthoquinone, a copper compound and an organic tin compound.

In principle, the antifouling paints of the present invention for controlling fouling organisms on ship bottoms and similar underwater surfaces thus contain a combination of 2-amino-3-chloro-1,4-naphthoquinone, a copper compound and an organic tin compound.

As the organic tin compound employed in the present invention, there are exemplified, for example, tributyl tin salts such as tributyl tin carboxylates, tributyl tin halides or the compounds of the formula:

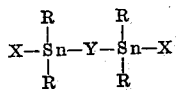

wherein R is lower alkyl having up to four carbon atoms, X is lower alkyl having up to four carbon atoms or acyloxy having up to 18 carbon atoms, and Y is oxygen or sulfur. Among these compounds, use is most advantageously made of tributyl tin fumarate, tributyl tin fluoride, bis-tributyl tin oxide, bis-tributyl tin sulfide, tetrabutylstannoxane-1,3-dioctanoate, etc.

The copper compounds, another essential antifouling ingredient, are exemplified by basic copper sulfate, copper abietinate, copper naphthenate, copper acetylacetonate, etc. As the basic copper sulfate, there can be used so-called conventional Bordeaux mixture or the basic copper sulfate compositions described in British Pat. No. 1,080,738, but the latter are more desirably employed. The latter compositions can be prepared by reacting copper sulfate with alkali hydroxide and phosphoric acid or salts thereof, and among such products, the basic copper sulfate obtainable by using the starting materials in the molar ratio of 1:1.5–1.4:0.002–0.1 shows particularly superior effect. It is to be understood that the above-mentioned ratio applies to cases where trialkali phosphates are employed, and that when any of phosphoric acid, alkali dihydrogen phosphate and alkali monohydrogen phosphate is used, it is advisable to use an additional amount of an alkali hydroxide, which neutralizes the phosphoric acid or its acid salts. The basic copper sulfate thus produced is bluish white fine powder and consists, for the most part, of a compound of formula

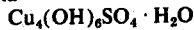

with a minor proportion of basic copper phosphate contained as impurity, and having the following spacings:

| | | |
|---|---|---|
| 6.95 | A | (very strong) |
| 3.47 | A | (medium) |
| 2.70 | A | (medium) |
| 2.62 | A | (medium) |
| 2.42 | A | (medium) |
| 2.33 | A | (medium) |
| 2.26 | A | (medium) |
| 2.02 | A | (medium) |
| 1.99 | A | (weak) |
| 1.54 | A | (medium) | and in general comprises the following ratios:

| Cu | : | 51–57 | weight % |
|---|---|---|---|
| SO₄ | : | 7–21 | weight % |
| PO₄ | : | 0.15–9 | weight % |
| OH | : | 22–26 | weight % |
| H₂O | : | 2–4 | weight % |

This basic copper sulfate has a Bordeaux index of 0.272 which is far lower than the 0.662 of well-known brochantite type basic copper sulfate. According to the present invention, this basic copper sulfate shows a remarkably strong antifouling effect when used together with the other two ingredients mentioned above.

The desirable porportions of 2-amino-3-chloro-1,4-naphthoquinone, the copper compound and the organic tin compound fall within the range of 2–4:2–4:1–8 (by weight), and the most advantageous synergistic effect is obtained in the case that they are used either in about equal proportion or with slightly excess proportions of the copper compound and the organic tin compound. The synergistic effect of these three ingredients is evident from tests 1 to 3 presented below. It it optional to add to the antifouling paints of the present invention any other antifouling agent or agents than the three main ingredients. In any case, sufficient antifouling effect is obtained by the use of the total amount of the three main ingredients in 5 to 30 weight % against the total weight of the paints.

The three main ingredients of antifouling paints of the present invention can be contained in the form of solution or dispersion together with suitable vehicles. These vehicles usually comprise binders, pigments, driers, solvents, and the like. As regards the binders for use in the present invention, various boiled oils (e.g. linseed oil, flaxseed oil, tung oil, etc.), various synthetic resins (e.g. polyvinyl resins, alkyd resin, acrylic resin, polyurethane resin, etc.), natural resins (e.g. rosin, cumarone, shellac, etc.), synthetic rubber, chlorinated rubber, butyl rubber, phenolic-base varnishes, tar pitch, etc. can be used to advantage. Among them, a desirable binder is a combination of rosin and synthetic resins (e.g. polyacrylic ester, polyacrylic acid, polyvinyl chloride, acrylic acid ester-vinyl chloride copolymer, acrylic acid ester-vinyl acetate copolymer, vinyl chloride vinyl acetate copolymer, etc.). The advantageous amount of rosin used in the present invention falls within the range of 5 to 20 weight % per the total antifouling paints and the amount of the resins is 5 to 20 weight % per the same, but it is desirable to employ a half to one part of rosin against one part of synthetic resins. The present antifouling paints can be applied to the substrates after a per se conventional manner such as spraying, coating, dipping, etc.

It should be understood that the antifouling paints of this invention can also be used for the purpose of controlling the deposition of dirt in the conduits of a water power plant. It should also be understood that since all the effective ingredients are practically soluble in organic solvents, the antifouling paints provide an even coating, making it possible to carry out the antifouling treatment of, particularly, nets and ropes for fishing or cultivation quite easily and in an effective manner.

It is to be understood that the following tests and examples are solely for the purpose of illustration and are intended to be construed as limitations of this invention, and that many minor variations may be resorted to without departing from the spirit and scope of this invention. Particularly, many variations and changes in binders, pigments, driers, solvents, plastic material and the like may be made by those skilled in the art in accordance with the principles set forth herein and in the claims annexed hereto. In the tests and examples, percentages are all on the weight basis.

TEST 1

Antifouling paints are prepared in accordance with the following formulation. Each of the paints is applied to fishing nets, followed by drying, and thus-treated fishing nets are immersed in sea water.

After a predetermined time, the extent of fouling of the respective fishing nets are observed.

Results are tabulated in table 1.

Formulation

| | |
|---|---|
| Active ingredient(s) (variable) | 6% |
| rosin | 15% |
| polyvinyl chloride | 5% |
| methylisobutylketone | 37% |
| toluene | 37% |

TABLE 1

| Active ingredient(s) | Content of active ingredient(s) (percent) | Density of marine growth in percent of the tested surface | | | |
|---|---|---|---|---|---|
| | | One month | Two months | Three months | Six months |
| Blank | 0 | 75 | 100 | 100 | 100 |
| Basic copper sulfate [1] | 6 | 15 | 100 | 100 | 100 |
| 2-amino-3-chloro-1,4-naphthoquinone | 6 | 20 | 100 | 100 | 100 |
| Bis-tributyl tin oxide | 6 | 0 | 0 | 0 | 90 |
| Copper salicylic acid chelate | 6 | 20 | 100 | 100 | 100 |
| Copper acetyl acetonate | 6 | 20 | 100 | 100 | 100 |
| Tetrabutyl-1,3-dioctyldistannoxane | 6 | 0 | 10 | 90 | 100 |
| 2-amino-3-chloro-1,4-naphthoquinone Basic copper sulfate Bis-tributyl tin oxide | 2<br>2<br>2 | 0 | 0 | 0 | 0 |

[1] The basic copper sulfate is prepared in the following manner.

To an aqueous solution of 50 grams of trisodium phosphate ($Na_3PO_4 \cdot 12H_2O$) in 880 milliliters of water, there were added simultaneously an aqueous solution of 1.1 kilograms of copper sulfate ($CuSO_4 \cdot 5H_2O$) in 4.95 liters of water, and 4.95 liters of 1.3-N sodium hydroxide, while stirring for 25 minutes. Then the resultant mixture was stirred for 30 minutes. The precipitates formed were collected by filtration, washed with water and then dried at 100° C. to yield 508 grams of pale fine powder.

1. Formulation (three-antifouling agent system):

| | |
|---|---|
| basic copper sulfate* | 6% |
| bis-tributyl tin oxide | 5% |
| 2-amino-3-chloro-1,4-naphthoquinone | 6% |
| polyvinyl chloride | 14% |
| methylisobutylketone | 34% |
| toluene | 34% |

* The same as used in Test 1.

2. Formulation

| | |
|---|---|
| 2-amino-3-chloro-1,4-naphthoquinone | 10% |

(This compound is referred to as "ACNQ" in the following table)

| | |
|---|---|
| copper or tin compounds | 6% |
| polyvinyl chloride | 14% |
| methylisobutylketone | 35% |
| toluene | 35% |

3. Commercial Paint I
   Steel ship bottom paint No. 2 type 4
   (Japanese Industrial Standard K5631)
   which contains, as a solid component, copper compound more than 34% calculated as copper oxide.

4. Commercial Paint II
   Steel ship bottom paint No. 2
   (Japanese Industrial Standard K5634)
   which contains, as solid components, polyvinyl chloride and copper compound more than 36% calculated as copper oxide.

TABLE 2

| Active ingredient(s) | Content (percent) | Density of marine growth in percent of the tested surface | | | | | | | |
|---|---|---|---|---|---|---|---|---|---|
| | | 1 month | 2 months | 3 months | 6 months | 8 months | 10 months | 12 months | 14 months |
| Blank | 0 | 75 | 100 | 100 | 100 | 100 | 100 | 100 | 100 |
| ACNQ<br>Basic copper sulfate | 10<br>6 | 25 | 50 | 75 | 100 | 100 | 100 | 100 | 100 |
| ACNQ<br>Copper anthranilate | 10<br>6 | 25 | 25-50 | 25-50 | 50-75 | 100 | 100 | 100 | 100 |
| ACNQ<br>Copper maleate | 10<br>5 | 100 | 100 | 100 | 100 | 100 | 100 | 100 | 100 |
| ACNQ<br>Copper salicylate | 10<br>6 | 100 | 100 | 100 | 100 | 100 | 100 | 100 | 100 |
| ACNQ<br>Copper salicylaldimine | 10<br>6 | 25 | 25 | 50 | 50 | 75 | 100 | 100 | 100 |
| ACNQ<br>Copper salicylaldehyde | 10<br>6 | 25 | 25 | 50 | 50 | 75 | 100 | 100 | 100 |
| ACNQ<br>Diformylstannoxane | 10<br>6 | 50 | 50 | 75 | 100 | 100 | 100 | 100 | 100 |
| ACNQ<br>Distearylstannoxane | 10<br>6 | 75 | 100 | 100 | 100 | 100 | 100 | 100 | 100 |
| ACNQ<br>Tributyl tin oxide | 10<br>6 | 0 | 0 | 0 | 0 | 0 | 25 | 50 | 100 |
| ACNQ<br>Disalicylstannoxane | 10<br>6 | 50 | 100 | 100 | 100 | 100 | 100 | 100 | 100 |
| Commercial Paint I | | 0 | 0 | 0 | 0 | 25 | 25 | 50 | 100 |
| Commercial Paint II | | 0 | 0 | 0 | 0 | 0 | 25 | 50 | 100 |
| ACNQ<br>Tributyl tin oxide<br>Basic copper sulfate | 6<br>6<br>6 | 0 | 0 | 0 | 0 | 0 | 0 | 0 | 50-75 |

TEST 2

Antifouling paints are prepared in accordance with the following formulations. Each of the paints are applied on iron sheets and thus-treated sheets are immersed in sea water. After predetermined times, the results are observed and tabulated in table 2.

TEST 3

An antifouling paint having the following formulation is painted on an iron sheet (400 × 400 × 3 mm.) and followed by drying. This treated sheet is soaked in marine water for evaluation of antifouling agent.

Formulation

| | |
|---|---|
| 2-amino-3-chloro-1,4-naphthoquinone | 4.5% |
| basic copper sulfate | 4.5%* |
| tributyl tin fumarate | 4.5% |
| rosin | 5% |
| polyvinyl chloride | 10% |
| methylisobutylketone | 36% |
| toluene | 35.5% |

*The same as used in Test 1.

TABLE 3

| Paints | Density growth in percent of the tested surface | | | |
|---|---|---|---|---|
| | 12 months | 14 months | 18 months | 20 months |
| Test paint | 0 | 0 | 0 | 25 |
| Commercial¹ Paint I | 40 | 100 | 100 | 100 |
| Commercial² Paint II | 0 | 0 | 25 | 100 |

¹ The same as Commercial Paint I used in Test 2.
² The same as Commercial Paint II used in Test 2.

EXAMPLE 1

| | |
|---|---|
| 2-amino-3-chloro-1,4-naphthoquinone | 2% |
| copper acetylacetonate | 2% |
| tetrabutyl-1,3-octyldistannoxane | 2% |
| rosin | 15% |
| polyvinyl chloride | 5% |
| methylisobutylketone | 37% |
| toluene | 37% |

EXAMPLE 2

| | |
|---|---|
| 2-amino-3-chloro-1,4-naphthoquinone | 2% |
| copper salicyladehyde chelate | 2% |
| bis-tributyl tin oxide | 2% |
| rosin | 15% |
| polyvinyl chloride | 5% |
| methylisobutylketone | 37% |
| toluene | 37% |

EXAMPLE 3

| | |
|---|---|
| 2-amino-3-chloro-1,4-naphthoquinone | 2% |
| copper salicylaldehye chelate | 2% |
| bis-tributyl tin sulfide | 2% |
| rosin | 15% |
| polyvinyl chloride | 5% |
| methylisobutylketone | 37% |
| toluene | 37% |

EXAMPLE 4

| | |
|---|---|
| 2-amino-3-chloro-1,4-naphthoquinone | 3% |
| copper naphthenate | 4.5% |
| tributyl tin fumarate | 4.5% |
| rosin | 7% |
| acrylic acid ester-vinyl chloride copolymer | 10% |
| methylisobutylketone | 35% |
| toluene | 36% |

EXAMPLE 5

| | |
|---|---|
| 2-amino-3-chloro-1,4naphthoquinone | 2% |
| basic copper sulfate | 2% |
| bis-tributyl tin oxide | 2% |
| rosin | 7% |
| polyvinyl chloride | 10% |
| methylisobutylketone | 39% |
| toluene | 38% |

EXAMPLE 6

| | |
|---|---|
| 2-amino-3-chloro-1,4-naphthoquinone | 2% |
| copper acetylacetate | 2% |
| tetrabutyl-1,3-octyldistannoxane | 2% |
| rosin | 7% |
| polyvinyl chloride | 10% |
| methylisobutylketone | 38% |
| toluene | 39% |

The foregoing formulations (examples 1 to 6) represent presently preferred typical embodiments of antifouling paint compositions useful for the purposes of the present invention as hereinbefore set forth.

What is claimed is:

1. In an antifouling paint comprising an antifouling effective amount of an antifouling agent and a suitable vehicle therefor, the improvement according to which the antifouling agent is constituted by a combination of 2-amino-3-chloro-1,4-naphthoquinone, a copper compound selected from the group consisting of a basic copper sulfate, copper abietinate, copper naphthenate and copper acetylacetonate, and an organic tin compound selected from the group consisting of bis-tributyl tin oxide, tetrabutyl distannoxane-1,3-dioctanoate, tributyl tin carboxylate, bis-tributyl tin sulfide and tributyl tin halide, in a weight ratio proportion of 2–4:2–4:1–8, respectively.

2. An improvement according to claim 1, wherein the total weight of the 2-amino-3-chloro-1,4-naphthoquinone, copper compound and organic tin compound falls within the range of 5 to 30 weight % relative to the total weight of the paint.

3. An improvement according to claim 1, wherein the tributyl tin carboxylate is tributyl tin fumarate.

4. An improvement according to claim 1, wherein the tributyl tin halide is tributyl tin fluoride.

5. An improvement according to claim 1, wherein the vehicle comprises a mixture of solvents, rosin and a resin selected from the group consisting of polyvinyl chloride, polyacrylic ester, polyacrylic acid, acrylic acid ester-vinyl chloride copolymer, acrylic acid ester-vinyl acetate copolymer, vinyl chloride-vinyl acetate copolymer and chlorinated rubber.

6. An improvement according to claim 5, wherein the amount of resin is within the range of 5 to 20 weight % of the total amount of the paint.

7. An improvement according to claim 5, wherein the amount of rosin is 5 to 20 weight % of the total amount of the paint.